J. M. BRADLEY & C. F. PIKE.
EYEGLASS CASE.
APPLICATION FILED JULY 25, 1913. RENEWED MAY 18, 1915.
1,158,170.
Patented Oct. 26, 1915.
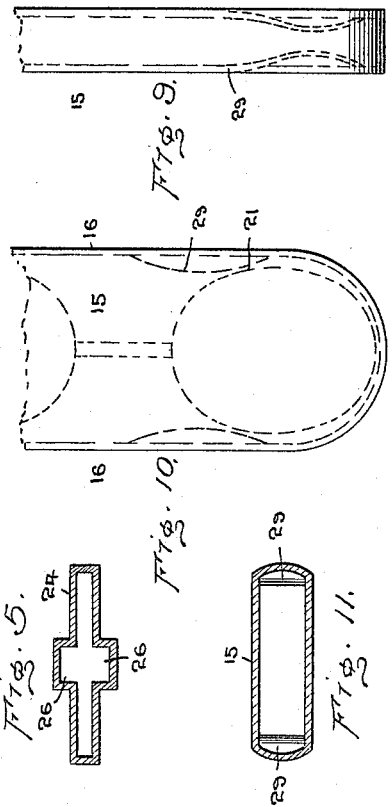
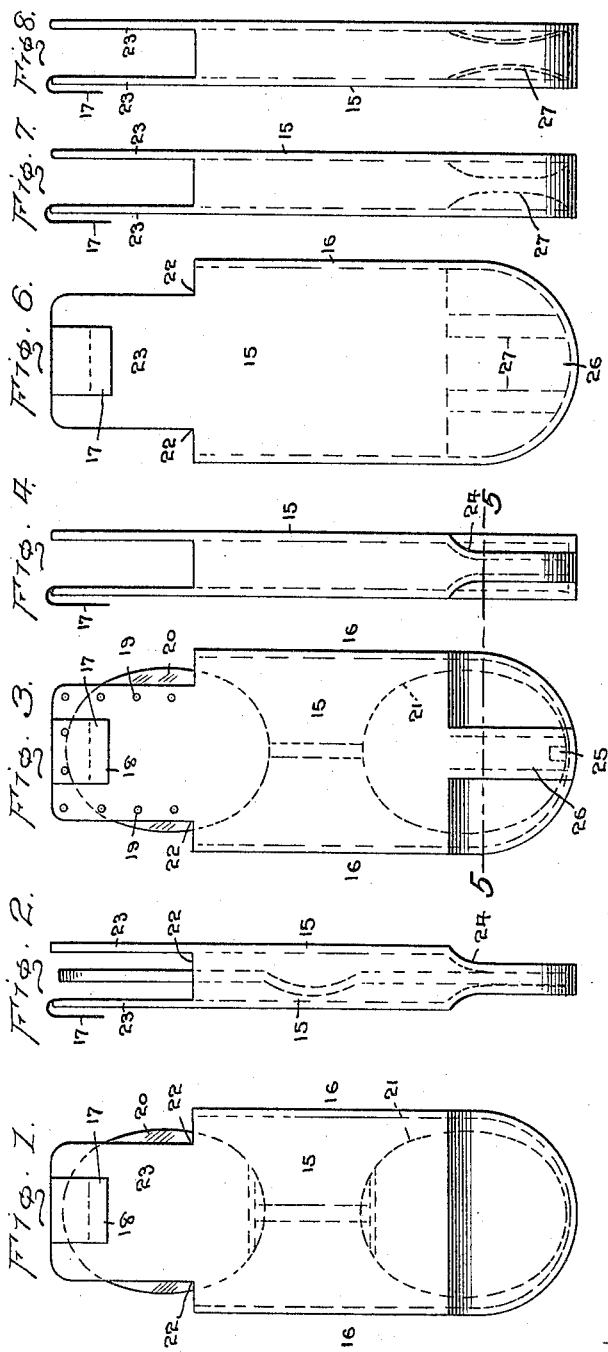
Witnesses
Inventors
John M. Bradley
Charles F. Pike
By
Wm. A. Pike, Attorney

UNITED STATES PATENT OFFICE.

JOHN M. BRADLEY AND CHARLES F. PIKE, OF PHILADELPHIA, PENNSYLVANIA.

EYEGLASS-CASE.

1,158,170.  Specification of Letters Patent.  Patented Oct. 26, 1915.

Application filed July 25, 1913, Serial No. 781,223. Renewed May 18, 1915. Serial No. 29,016.

*To all whom it may concern:*

Be it known that we, JOHN M. BRADLEY and CHARLES F. PIKE, citizens of the United States, residing at Philadelphia, in the county of Philadelphia and State of Pennsylvania, have invented certain new and useful Improvements in Eyeglass-Cases, of which the following is a specification.

This invention relates to eyeglass cases and has for its object to provide a case of improved construction whereby a lens of an eyeglass may be readily grasped by the thumb and forefinger upon the edges thereof in order to insert the glass into or remove it from the case.

A further object of the invention is to provide an eyeglass case with improved means for holding the glass against accidental falling therefrom when the user stoops over or reverses the position of the case.

A further object of the invention is to provide an improved eyeglass case in which provision is made for the accommodation of projections of the kinds usually found on glasses.

With these, and other objects as may hereinafter appear, in view, the invention consists in the improved construction, arrangement, and combination of the parts of eyeglass cases which will be hereinafter fully described and afterward specifically claimed.

In order that the construction and operation thereof may be readily comprehended, we have illustrated approved embodiments of our invention in the accompanying drawings, in which—

Figure 1 represents a view, in side elevation, of an eyeglass case in one of the forms which our invention may assume, a pair of eyeglasses being shown therein, principally in dotted lines. Fig. 2, an edge elevation thereof, Figs. 3 and 4, respectively, side and edge elevations, showing modified means for holding the glasses in the case, and means for accommodating projections on the glasses. Fig. 5, a transverse sectional view on the plane indicated by the broken line 5—5 of Figs. 3 and 4. Fig. 6, a view in side elevation showing modified holding and accommodating means, Figs. 7, 8, and 9, whole and partial edge elevations, Figs. 10 and 11, a partial side elevation and a transverse section of another modified form.

Where any parts are seen in a plurality of the figures of the drawings, they are indicated by the same reference characters.

Referring specifically to the drawings 15, 15, indicate the sides and 16, 16, the edges, of an eyeglass case which may be made of any suitable material and of a proper contour to receive the glasses, the upper end being open.

In order that the case may be secured to the clothing of the user, it may be provided with a hook or catch 17 which, when the case is made of material to suit, may be made as part of the case, or it may be made of a separate plate 18, or the case may be secured to the clothing by any suitable means, such, for instance, as by stitching through holes 19. By these means the case may be secured to the garment, or within a pocket therein, and the glasses removed therefrom, or replaced, therein, without the trouble of handling the case, thus avoiding the great inconvenience and delay attending the removal of the case from a pocket, opening it, holding it, in one hand and removing the glasses with the other, returning the glasses to the case, and returning the case to the pocket.

In order that the glasses may be readily removed from the case, especially such glasses as have nothing on the lenses to take hold of, such lenses being shown at 20 and 21 in Figs. 1 and 3, the outer corners of the case are cut away, as at 22, leaving central tongues 23 which substantially inclose and protect the lens 20, its edges however for more than half its length projecting slightly beyond the tongues in position to be grasped by the thumb and forefinger and be readily removed from the case, or replaced therein, without touching the surfaces of the lenses with the thumb or fingers.

The lower end of the case is contracted, at 24, making the space between the sides thereof narrow enough to frictionally hold the lens 21 and thus prevent the glasses dropping out of the case when it is inserted, as for instance when a person having a case secured to a garment, stoops over far enough to ordinarily permit the glasses to drop out.

To accommodate any projection, such as shown in dotted lines at 25 in Fig. 3, the contracted end 24 of the case is provided with laterally projecting guides defining grooves 26, in which the projection may move without friction.

As a modification in the structure of the case, the contracting of the lower end of the case may be omitted, and two frictional projections, as at 27, may be used, inside that end of the case, to prevent the glasses dropping out. These projections, in Figs. 6, 7, and 8, are shown as inwardly bowed springs, being shown in Fig. 9 at 29 as part of the material of the case.

In Figs. 1 to 9, the frictional means for holding the glasses in the case are arranged to bear upon the faces of the lens, but in Figs. 10 and 11, are frictional devices, in the form of springs 29 to bear upon the edges of the lens 21 for the same purpose of preventing the glasses dropping out of the case. Both classes of springs may be used in the same case, if desired.

The glasses will always be in their proper cases and it will not be necessary to remember which pocket contains the case for the far or for the near glasses when desired for use.

While we have specifically described the several features comprised in our invention, we desire it to be understood that changes and variations may be made therein, within the terms of the claims, without departing from the spirit and scope of the invention.

Having thus fully described our invention, what we claim as new and desire to secure by Letters Patent of the United States is—

1. An eyeglass case provided at its top with tongues arranged to extend above the edge of the upper lens of a pair of contained glasses and being of less width than the lens and of a length to expose the edges of the lens beyond the sides of said tongues for more than half the length of the lens whereby to permit the lens to be grasped without contact with the intermediate surface thereof, thus to prevent smudging.

2. An eyeglass case provided at its bottom portion with means for clamping the lower lens of a pair of contained glasses to retain them within the case when the latter is inverted, and having its top provided with tongues arranged to extend above the edge of the upper lens of a pair of contained glasses and being of less width than the lens whereby to permit the latter to be grasped without contact with the intermediate surface thereof, thus to prevent smudging.

3. An eyeglass case provided at its lower portion with means for clamping the lower lens of a pair of contained glasses to retain them within the case when the latter is inverted, said clamping means being centrally provided with grooves for the reception of projections on the lower lens or on the eyeglass frame.

In testimony whereof we affix our signatures in presence of two witnesses.

JOHN M. BRADLEY.
CHARLES F. PIKE.

Witnesses:
M. ABRAHMSON,
JOHN A. BARRY.

Copies of this patent may be obtained for five cents each, by addressing the "Commissioner of Patents, Washington, D. C."